United States Patent [19]
Schröder

[11] 3,916,318
[45] Oct. 28, 1975

[54] ARRANGEMENT FOR THE PROGRAMMING OF DIGITAL STORAGES WITH AN ANALOG OUTPUT FOR THE USE IN TELEVISION OR RADIO RECEIVERS

[75] Inventor: Wolfgang Schröder, Pforzheim, Germany

[73] Assignee: International Standard Electric Corporation, New York, N.Y.

[22] Filed: Oct. 29, 1974

[21] Appl. No.: 518,423

[30] Foreign Application Priority Data

Nov. 14, 1973 Germany .......................... 2356858

[52] U.S. Cl. .............................. 325/464; 325/470
[51] Int. Cl.[2] ....................................... H04B 1/06
[58] Field of Search ........... 325/464, 465, 468, 470, 325/459; 334/14–16, 18

[56] References Cited

UNITED STATES PATENTS 3,864,637 2/1975 Kanow ............................ 325/470

*Primary Examiner*—Albert J. Mayer
*Attorney, Agent, or Firm*—John T. O'Halloran; Menotti J. Lombardi, Jr.; Peter Van Der Sluys

[57] ABSTRACT

Digital storages have outputs providing analog voltages that are controlled by stepping pulses at forward and backward setting inputs. A manual potentiometer associated with a frequency dial provides a voltage of opposite plurality to that of the digital storages. Programming of a digital storage is accomplished by connecting stepping pulses to the setting inputs and connecting the output to a comparator circuit having a bridge which also is connected to the potentiometer voltage. The comparator circuit provides an output to gates disposed at the forward and backward setting inputs of the storages for controlling the forward and backward stepping pulses passed to the storage being programmed so that the analog output voltage from the storage being programmed is set to be equal and opposite to the manually set potentiometer voltage.

6 Claims, 1 Drawing Figure

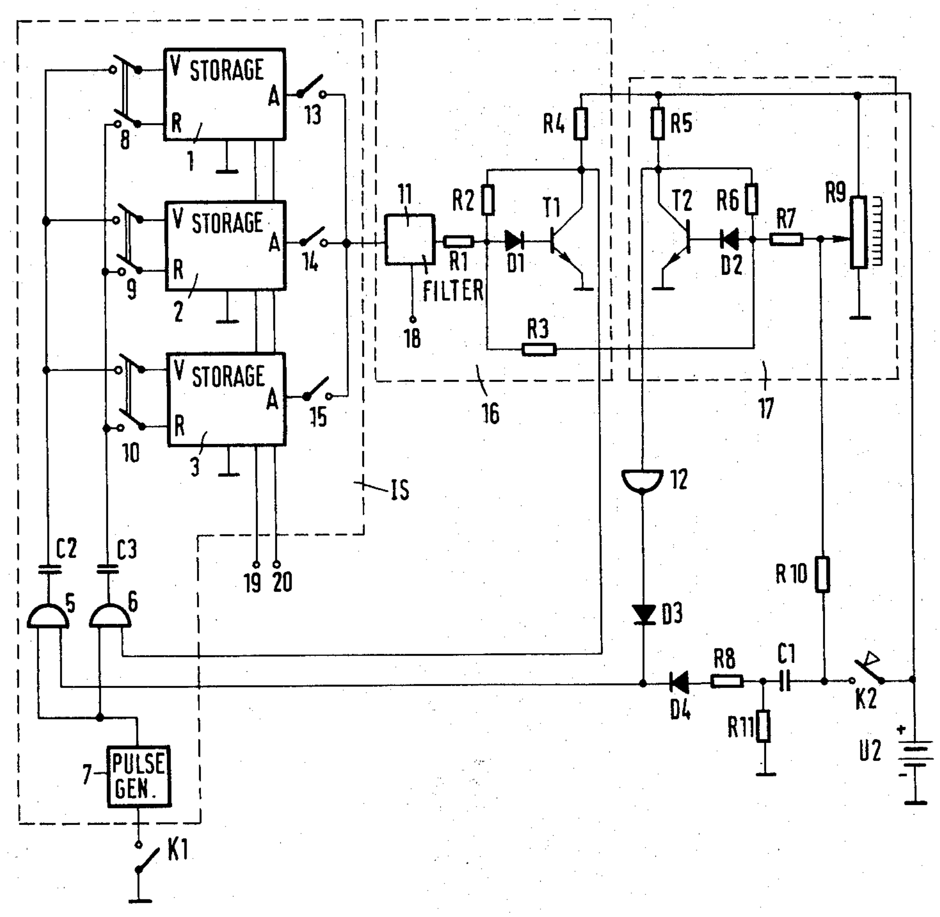
V STORAGE
A
R
V STORAGE
A
R
V STORAGE
A
R
1
2
3
8
9
10
13
14
15
11
FILTER
18
R1
R2
D1
T1
R3
R4
R5
T2
R6
D2
R7
R9
16
17
IS
12
19
20
C2
C3
5
6
7
PULSE GEN.
K1
D3
D4
R8
C1
R10
R11
K2
U2

ARRANGEMENT FOR THE PROGRAMMING OF DIGITAL STORAGES WITH AN ANALOG OUTPUT FOR THE USE IN TELEVISION OR RADIO RECEIVERS

BACKGROUND OF THE INVENTION

1. Field of the Invention

The present invention relates to a circuit arrangement for the programming of digital storages employing an analog output for the tuning voltage of voltage-variable capacitors (varactor diodes) in television or radio receivers.

2. Description of the Prior Art

It is already known to use counters with an analog output as tuning voltage storages for the varactor diode tuning in radio and television engineering. Such storages are also referred to as counting circuits or information storages (cf. German Pat. No. 1 059 508). They operate as staircase signal generators with a great number of signal steps and may be brought to a standstill on any arbitrary one of these steps, e.g. by interrupting the sequence of input pulses. When using several such storages, it is also possible to store a corresponding number of tuning voltages.

The frequency of the input pulses of the counter is determinative of the tuning speed. There are counters or storages which are capable of being readjusted via forward and backward setting inputs, in either the forward or the backward direction, with there simultaneously appearing a corresponding positive or negative voltage variation at the analog output.

Known are also station-finding circuits using such types of counter or storage circuits (cf. technical journal "Funkschau" 1971, No. 17, pp. 535–537 and No. 18, pp. 587–589).

The pulses serving the stepping on of the counter are applied with a predetermined counting frequency to the input of the counter, with the analog voltage thereof varying at the output in fine steps. This staircase voltage effecting the through-tuning of the receiver as a tuning voltage, automatically remains on the voltage step corresponding to the receiving frequency of the intelligence carrier signal, when the stepping pulses at the counter input are interrupted by the evaluating circuit.

Such an automatic station-finding circuit fails to operate in cases where there are not concerned any technically seizable criteria in selecting a receiving frequency, or in cases where the carrier does not at all exist at the moment of the station-finding operation.

SUMMARY OF THE INVENTION

The invention is based on the problem of achieving with respect to such circuits an individual tuning by simultaneously indicating the tuning position by involving a small as possible technical investment.

The invention in particular offers the advantages that the station finding will tune the receiver also to such stations whose carrier is not present at the moment of the station-finding operation, and that, moreover, the most simple solutions are given, above all, with respect to the programming, with the aid of MNOS-circuits relating to this particular case of practical application. In addition to the foregoing, the indication only involves a small investment.

There is used a manually operable type of potentiometer whose setting is transferred to lthe storage by means of a bridge comparison in such a way that the stepping signals of the storage are interrupted upon reaching the bridge balance. In cases where the bridge balance is not reached, the storage, quite depending on the drift, is stepped on either in the forward or backward direction. The potentiometer is provided with a dial for indicating the tuning position, or with a frequency or channel dial covering all ranges, with an illuminated indication relating to the respective range, for the purpose of programming all digital storages which are capable of being switched on via sensors, in response to the actuation of a switch. Upon actuation of the potentiometer, the storage will follow the slider position until the bridge balance is at its optimum, and until the stepping signals are switched off automatically.

In cases where the analog voltage at the storage output, for example, extends from zero towards negative voltage values, the potentiometer may appropriately be given the opposite controlling sense, i.e. the antipolar sense or positive voltage. A point of symmetry respectively established across one resistor each, will supply in opposition to the mass potential, the switching voltage for the running direction of the storage to be retuned. The bridge balance is reached as soon as the voltage at the point of symmetry becomes zero.

With respect to arrangements which, subsequently to the sweeping of a range, automatically pass through the next receiving range, as is also known e.g. from the German Pat. Nos. 1,466,416, 1,516,855, and the German petty Pat. No. 1.952,073 with respect to photoelectric target finding, the just received range is indicated by a signal, for example by illuminating the associated section of the multiple dial of the potentiometer.

As long as the analog output voltage of the storage has not passed through its maximum, the just operated receiving range will also remain to be switched on in the case of a balancing voltage moving backwards and forwards. Upon reaching the maximum, a switch over is effected to the next range. In this way there is provided the possibility of letting the counter run to the end of the range corresponding to the maximum of the tuning voltage by means of a keying contact producing a positive voltage at the slider output of the potentiometer well dimensioned as to duration and amplitude, in order to switch on the next receiving range thereafter. In response to each key pressure, it is possible in this way to select another range.

After in the chosen range, the desired tuning frequency has been set with the aid of the potentiometer, and when the tuning voltage value is present on the switched-on storage, the storage may be disconnected and another storage may be connected for the purpose of effecting a new programming. After all programming operations have been completed, the pulse generator, supplying the stepping pulses for the storage inputs, is disconnected, and the potentiometer is prevented from acting upon any other storage.

BRIEF DESCRIPTION OF THE DRAWING

The drawing shows a schematic diagram of one embodiment of the invention.

DESCRIPTION OF THE PREFERRED EMBODIMENT

The module indicated by the reference IS contains e.g. the storages 1, 2 and 3, the number of which may be increased at will. The storages must be capable of supplying a voltage output extending from zero towards a negative voltage. As storages it is possible to use the following: dynamic synchronized information storages according to the German Pat. No. 1,059,508, or any other multistable arrangements, digital binary storages employing digital-to-analog converters, shift-register circuits in accordance with the known MNOS-technique, or any other electronic stepping switches. Such arrangements are well known and do not need to be described in greater detail herein. The programming is effected, as will still be explained in greater detail hereafter, via the digital storages capable of being switched on e.g. with the aid of sensors, by means of a switch ("programming on"). Each of these storages, via a double-pole switch 8 and 9 as well as 10, which are preferably of the electronic type, has access of an AND-gate 5 for the forward input V and to an AND-gate 6 for the backward setting input R, if necessary galvanically decoupled via capacitors C2 and C3.

The first input of each of the AND-gates is applied to the output of a pulse generator 7 which is capable of supplying the setting pulses after certain requirements placed on the storage inputs, have been met. The first three requirements are as follows:

1. the on-off switch *k*1 for the pulse generator 7 must be closed
2. each time one of the three double-polar electronic switches 8, 9, or 10 must be closed
3. one of the three electronic switches 13, 14, or 15 at one of the outputs A must be closed.

Further requirements are determined by the cooperation of the output circuit 16 and of the potentiometer circuit 17 to be explained hereinafter.

The output circuit 16 is connected through one of the switches 13, 14 or 15, via a time-constant and filter network 11, and across the resistors R1, R3 and R7 to the slider of the potentiometer R9 forming part of a potentiometer circuit 17.

The voltage as supplied across the resistor R1 from the module IS is negative with respect to ground, and the one supplied across the resistor R7 is positive. If the resistors R1 and R7 are alike, and when the amounts are the same as regards the positive and negative voltage across these resistors, identical voltage values with an opposite sign with respect to ground will also appear across the resistor R3. The base electrodes of the two transistors T1 and T2 serving as threshold switches, are applied to the two terminals of R3. For protection against potential reversals and breakdowns, they are connected via the diodes D1 and D2. The emitters of the two npn-transistors are applied to ground and their collectors, across the resistors R4 and R5, are connected to the supply voltage U2.

The operating points are so adjusted by the resistors R2/R3/R6, that in the case of a symmetry of the antipolar voltages across R1 and R7, the transistor T1 is just rendered conductive, T2 however not yet.

If the potentiometer R9, by means of its slider, is readjusted in direction of the positive supply voltage U2, the transistor T1 will remain conductive, the voltage at the collector of T1 and, consequently, also at the second input of the AND-gate 6, will remain in the proximity of the ground potential, and the backward setting inputs will thus receive no signals. The transistor T2, however, is rendered conductive and will release, via the inverter 12, the gate 5 for the forward setting pulses. the just switched-on storage 1, 2 or 3 will correct its output voltage as appearing negatively in the output circuit 16 until, in the forward direction, the negative potential has risen to the same value as the positive potential at the slider. In the instant of reaching symmetry, the transistor T2 is switched off again and, via an inverter 12, will block the gate 5. If, however, the potentiometer R9 is readjusted at the slider output in direction of the ground potential, then the transistor T1 will switch off and, by the positive voltage as arising across the resistor R4, will release the AND-gate 6 for the backward setting pulses. In the backward direction, the storage is reset to such an extent that its negative output voltage in direction of the ground potential will approach the symmetry setting, at which the transistor T1 is switched on again for blocking the gate 6. The tuning voltage for the varactor diodes of the radio or television receiver is taken from the output 18 of the circuit 11.

Waverange selection, the switching of which within the circuit arrangement IS is effected automatically after each complete performance of a counting cycle, is carried out with the aid of the keying contact K2. Waverange switching of the connected receiver is effected via the terminals 19 and 20.

In the course of this the charge of the capacitor C1 is automatically adapted to the position of the potentiometer R9. Across the resistors R10 and R11, this capacitor charges itself to the voltage value at the slider of the potentiometer R9. Upon actuation of the keying contact K2, there is effected the residual charging of the capacitor C1 across the resistor R8 and via the diode D4, as well as across the input resistor of the gate 5. The residual charging process together with the residual voltage and the time constant R8 . C1 is determinative of the permeability of the gate 5 with respect to the forward setting pulses controlling the switched-on storage, via its forward setting input V to the end of a counting cycle and to the starting of the waverange switching. By the properly dimensioned previous charging of C1, it is avoided that, upon closing K2 and in an unfavorable position of the slider in the proximity of the positive voltage maximum, that the gate 5 will remain permeable for an excessive period of time and that possibly one complete waverange switching position is being skipped.

What is claimed is:

1. A circuit arrangement for programming digital storages of the type that provides an analog output voltage for tuning variable capacity diodes in television or radio receivers, comprising:

digital storage means for providing an analog output voltage, said storage means including a forward stepping input and a backward stepping input for controlling the level of the analog output voltage;

pulse generating means for providing stepping pulses for the digital storage means;

a pair of gate means disposed between the output of the pulse generating means and the forward and backward stepping inputs of the storage means;

a manually operated potentiometer provided with a frequency and channel dial for all ranges and a slider contact, said potentiometer being connected to a source of voltage opposite in polarity to the voltage provided by the analog output of the storage means so that the slider contact provides a variable voltage output;

bridge means connecting the output of the potentiometer slider to the analog output of the storage means, said bridge means having two terminals serving as comparator terminals;

a pair of threshold switches having control inputs connected to the comparator terminals, said threshold switches having outputs arranged to control the pair of gate means in response to the voltage across the comparator terminals so that the gate means passes pulses to either the forward or backward stepping inputs until the analog output voltage of the storage means is of opposite potential to but equal to the voltage provided on the slider contact of the manually operable potentiometer, whereby the digital storage means may be programmed by setting the manually operable potentiometer to desired stations on the frequency dial.

2. A circuit arrangement as described in claim 1, wherein the pair of gate means comprise AND gates having outputs connected to the forward and backward stepping inputs of the storages by way of manually operated switches, first inputs of the AND gates being connected to the pulse generator means, second input of one AND gate being connected to and controlled by the output of one threshold switch and the second input of the other AND gate being connected to the output of the other threshold switch through an inverter.

3. A circuit arrangement as described in claim 1, additionally comprising means for supplying setting pulses to the storage means by way of a keying contact for driving said storage to a maximum output voltage.

4. A circuit arrangement as described in claim 3, wherein the keying contact is connected to the gate means supplying the setting pulse to the forward stepping input of the storage means so that the gate means continuously passes the stepping pulses from the pulse generator means to the storage means setting input.

5. A circuit arrangement as described in claim 4, wherein a capacitor is disposed between the keying contact and the input to the gate means, said capacitor charges through a resistor by way of the keying contact so that the gate means supplies setting pulses during the charging period of the capacitor.

6. A circuit arrangement as described in claim 5, wherein said capacitor is connected on the key contact side by way of decoupling resistors to the slider of the potentiometer and on another side to the input of the gate means so that said capacitor always charges to the voltage on the slider thereby limiting the time of the charging period when the key contact is closed.

* * * * *